United States Patent [19]
Edwards

[11] 3,820,931
[45] June 28, 1974

[54] INJECTION MOLD FOR PRODUCING OPEN-MOUTHED THIN-WALLED CONTAINERS HAVING MEANS TO PREVENT RADIAL DEFLECTION OF THE MALE MOLD PART

[75] Inventor: Bryant Edwards, Clarendon Hills, Ill.

[73] Assignee: Illinois Tool Works Inc., Chicago, Ill.

[22] Filed: Nov. 20, 1972

[21] Appl. No.: 308,200

Related U.S. Application Data
[62] Division of Ser. No. 214,166, Dec. 30, 1971, abandoned.

[52] U.S. Cl............... 425/242 R, 264/328, 425/247
[51] Int. Cl............................................. B29f 1/00
[58] Field of Search... 425/242 R, 247, 4, DIG. 817, 425/398, 416; 264/328

[56] References Cited
UNITED STATES PATENTS

| | | | |
|---|---|---|---|
| 3,351,978 | 11/1967 | Kraus et al.......................... | 425/4 X |
| 3,397,266 | 8/1968 | Ayres............................... | 425/247 X |
| 3,436,446 | 4/1969 | Angell Jr............................ | 425/4 X |
| 3,629,385 | 12/1971 | Badavas et al................... | 264/328 X |

FOREIGN PATENTS OR APPLICATIONS

| | | | |
|---|---|---|---|
| 1,101,007 | 1/1968 | Great Britain..................... | 425/242 |

*Primary Examiner*—J. Spencer Overholser
*Assistant Examiner*—David S. Safran

[57] ABSTRACT

The apparatus and process for injection molding relatively thin walled and relatively deep hollow plastic articles with accurately controlled wall thicknesses.

1 Claim, 4 Drawing Figures

PATENTED JUN 28 1974  3,820,931

INJECTION MOLD FOR PRODUCING OPEN-MOUTHED THIN-WALLED CONTAINERS HAVING MEANS TO PREVENT RADIAL DEFLECTION OF THE MALE MOLD PART

BACKGROUND OF THE INVENTION

This is a division of application Ser. No. 214,166, filed Dec. 30, 1971, now abandoned.

The invention is intended for use in the field of injection molding of plastic materials and is particularly directed toward the molding of thin walled hollow articles with accurately controlled wall thicknesses. While the process and apparatus of the subject invention will produce accurately controlled wall thicknesses in a multitude of different articles, it finds ideal application to the manufacture of disposable thin-walled plastic cups or containers. Such containers are generally deeper than wider and a prior art mold for such a container is shown in cross-section in FIG. 1 of the drawing. The injection mold is generally of at least two parts to permit separation of the parts and removal of the completed container, and the outer or female mold is generally provided with an injection nozzle for injecting molten plastic into the mold cavity at what is intended to be the bottom center of the molded container. The male mold part or mold plug co-operates with the female mold to define the mold cavity.

The cross section shown in FIG. 1 is a longitudinal cross section through the center of the mold plug and it should be understood that the cavity in the completed mold defines a circular container having upwardly and outwardly tapered side walls. The molten plastic which is delivered to the injection nozzle at 10 is generally under relatively high pressures, such for example as 20,000 psi. In a prior art mold such as shown in FIG. 1 with a relatively flat or upwardly formed bottom, the high pressure molten plastic in entering bottom of the cavity will tend to flow over the area defining the bottom wall of the container, and thence upwardly to form the side walls, and to the upper rim of the container. In such prior art molds the molten plastic can easily reach the side wall on one side of the cup before reaching the opposite side. Due to the high pressures, the molten plastic in reaching one area of the side wall will exert side thrust on the mold plug to cause the mold plug to slightly shift toward the opposite side wall as shown in FIG. 1. The slight shift in the mold plug will remain and can become greater as the molten plastic completely fills the cavity. In the injection molding of relatively thin walled disposable plastic containers even a slight shift of the mold plug is a serious problem. Such containers are generally designed with a wall thickness of about .020 inches, and in the molding of such containers with standard plastic pressures it has been found that the mold plug will often shift .006 inches. This shifting will cause a difference in wall thickness from one side of the container to the other of .012 inches, which is more than one-half of the designed wall thickness of the containers.

SUMMARY OF THE INVENTION

The present invention overcomes the above described serious problem in the prior art injection molding of relatively thin walled and relatively deep hollow plastic articles. In a reduction to practice of the subject invention, the completely unexpected result of plastic articles with extremely accurately controlled wall thickness has been found. The unique process of the subject invention involves the injection of the high pressure molten plastic into a mold cavity and circumferentially about a small confined area adjacent to the injection molding nozzle to effectively lock the male and female mold parts from relative shifting as further molten plastic is forced into the remaining larger parts of the mold cavity. In the novel apparatus of the subject invention, the male plug is provided with a relatively small pin projection aligned axially of and immediately adjacent to the injection nozzle. The female mold is formed to have an annular or circumferential projection positioned about the pin of the molding plug so that the high pressure molten plastic in initially being ejected from the injection nozzle, substantially immediately occupies the space about the pin on the mold plug and within the axial projection of the female mold to effectively lock or prevent the mold plug from any radial shifting as the molten plastic is further injected into and fills the mold cavity. The construction of the invention may also be described as a circumferential overlap of the mold parts concentrically of the injection nozzle.

The primary object of the invention is to provide a process and apparatus for high pressure injection mold of relatively thin walled and relatively deep hollow plastic articles with accurately controlled wall thicknesses.

Other objects and features of the invention will be apparent upon a perusal of the hereinafter following specification and drawing.

DETAILED DESCRIPTION OF THE PREFERRED EMBODIMENT

Figure 2:
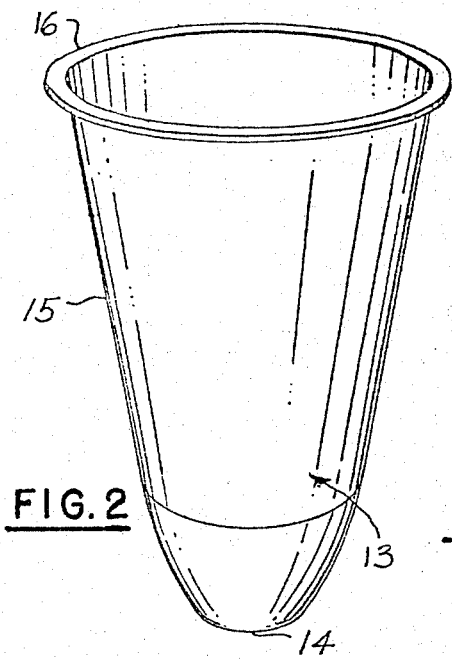
FIG. 2 is a perspective view of a container made according to the process and apparatus of the present invention.

In the preferred embodiment an outer or female injection mold part is shown at 11. The mold plug 12 co-operates with the female mold 11 to define a mold cavity to mold the container shown at 13 in FIG. 2. The female mold 11 may be constructed of one or more parts.

It should be understood that the container 13 merely represents one form of an article of manufacture that is ideally produced by the process and apparatus of the invention. The container 13 is a good example, because it represents an article which is considerably deeper than wide and further represents a type of article that is commonly molded with a relatively thin wall. The container 13 has a bottom wall 14 and upwardly extending side walls 15 terminating in a rim 16 at the open upper end of the container. The side walls 15 are tapered to provide an increasing cup diameter in an upward direction.

Figure 3:
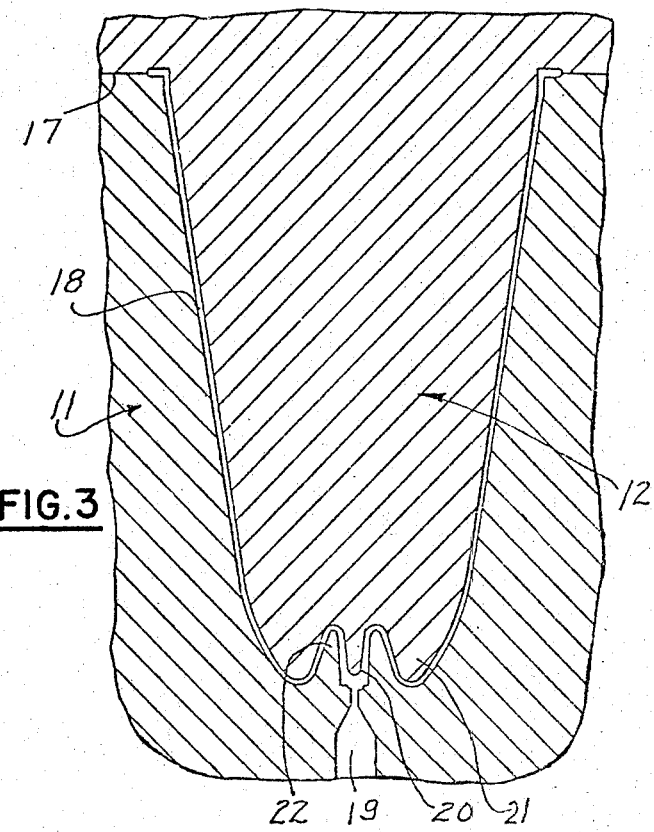
FIG. 3 is a cross sectional view of an injection mold constructed according to the invention.

The mold parts 11 and 12 co-operate along a plane, such as may be defined by the line 17 in FIG. 3, to define a cavity 18 therebetween. The center lower end of the cavity 18 is provided with an injection nozzle 19 for delivering molten plastic under relatively high pressures to the mold cavity 18.

The mold plug 12 is provided with a pin 20 which extends axially of the nozzle 19 and closely adjacent thereto. The mold plug 12 in the present embodiment is further provided with a depending somewhat annular and tapered lower wall section 21 which encircles the pin 20. The tapering wall section 21 is not essential to the present invention and the wall section 21 may have any other desired shape.

The female mold 11 is provided with an annular wall section 22 which must encircle at least a portion of the pin 20 to provide the necessary circumferential interlock or overlap of the pin 20 and the section 22. The annular wall section 22 further encircles the injection nozzle 19.

Figure 4:
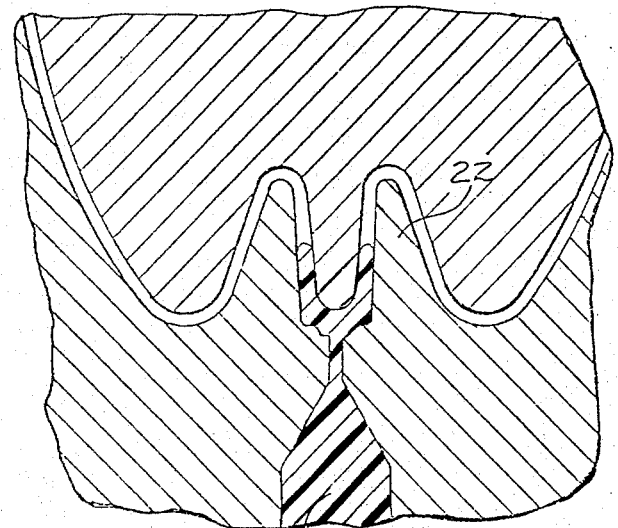
FIG. 4 is an enlarged fragmentary view of the structure shown in FIG. 3.
Figure 1:
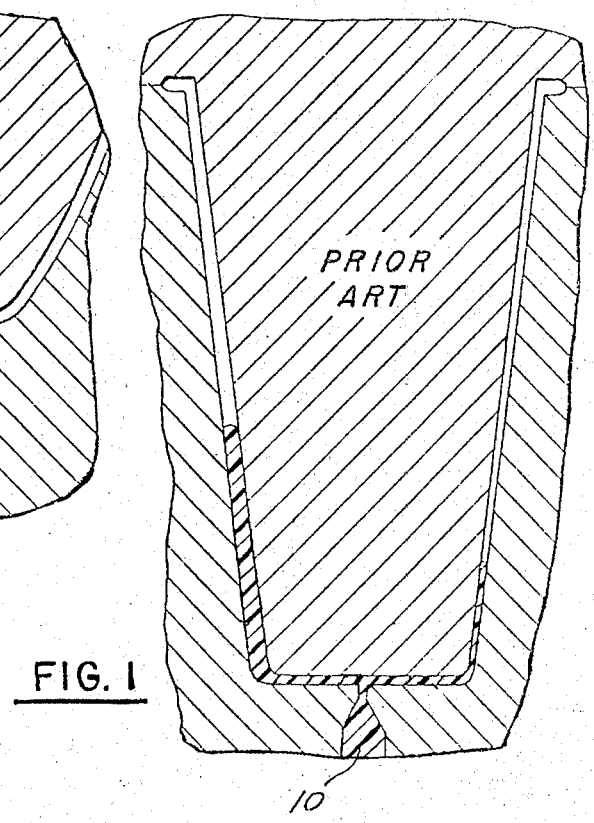
FIG. 1 is a cross sectional view of an example of a prior art injection mold.

It may be seen in FIG. 4 that when the molten plastic under pressure is injected through the nozzle 19 into the space about the pin 20 and within the wall section 22, the molten plastic will substantially immediately fill the relatively small annular space about the pin 20. This condition effectively locks or prevents the plug 12 from radial deflection as the molten plastic is further injected through the other portions of the cavity. It should be noted that all of the other portions of the cavity 18, axially and radially disposed from the injection nozzle 19 need not and may not be uniformly filled. The present invention will provide accurately controlled wall thicknesses in a molded article unless the mold design for the article is so unbalanced radially of the injection nozzle that radial deflecting forces are created which are in excess of the locking force of the pin 20 and annular wall section 22 of the present invention.

Having described the invention, it is to be understood that changes can be made in the described embodiment by one skilled in the art within the spirit and scope of the invention as defined in the claims.

I claim:

1. The apparatus for producing an open-mouthed elongated relatively thin-walled plastic container with controlled wall thickness comprising, a female mold having an open end for receiving a male mold and having injection nozzle means at the other end thereof on the axis of said open end, an elongated male mold of a length rendering one end of said male mold susceptible to radial deflection relative to the other end thereof, said male mold mounted in said female mold with said one end of said male mold adjacent to said injection nozzle means and the other end of said male mold fixed over said open end of said female mold to define a mold cavity in the shape of said plastic container, an integral pin on said one end of said male mold and co-axial with and immediately adjacent said injection nozzle means, an integral circumferentially continuous annular projection on said other end of said female mold and concentric of said pin to direct and confine the initial charge of any molten plastic material from said injection nozzle means about and longitudinally of said pin, and an integral circumferentially continuous annular projection on said one end of said male mold and arranged concentrically about said annular projection on said female mold to receive any molten plastic material from about said pin therebetween, whereby to effectively prevent radial deflection of one end of said male mold when said cavity is filled with molten plastic from said injection nozzle means.

* * * * *